Nov. 21, 1961  H. B. JACOBSON  3,009,279

FISHING LURE WITH INTERCHANGEABLE MOUNTING MEANS FOR HOOKS

Filed April 2, 1958

INVENTOR:
HUBERT B. JACOBSON
BY
Horton, Davis, Brewer & Brugman
ATT'Y

United States Patent Office 3,009,279
Patented Nov. 21, 1961

3,009,279
FISHING LURE WITH INTERCHANGEABLE MOUNTING MEANS FOR HOOKS
Hubert B. Jacobson, 1921 N. Damen Ave., Chicago, Ill.
Filed Apr. 2, 1958, Ser. No. 725,814
1 Claim. (Cl. 43—42.09)

This invention relates to fishing lures and particularly to an interchangeable mounting means for the hooks or barbs for such lures.

There is available at the present time a very large assortment of fishing lures of various shapes and sizes and equipped with a variety of types and sizes of hooks. The hooks supplied with a given lure are permanently secured thereto and hence the lure must be stored with its hooks attached. If the fisherman is fastidious, he will provide a separate box, or enclosure, for each lure and its attached hooks to prevent the hooks from one lure from becoming entangled with the hooks of another, or a series of other lures. The space requirement for each box renders the storage of a large variety of lures somewhat of a problem. Thus, it may be necessary to purchase and transport from place to place a large tackle box in which sufficient room is supplied for all of the individually boxed lures that a fisherman may take on a fishing trip, or alternatively, the fisherman may leave a part of his supply of lures at his camp or base of operations and take only those few which he feels he will require on any given day or fraction of a day away from his camp or base. In the latter case, if he misjudges fishing conditions, he may find that he has taken the wrong lures with him and may have to return to his camp and lose some fishing time.

It frequently occurs that the hooks supplied with a lure are not correct for the conditions existing at the moment, and that a larger or a smaller hook or a lesser number of hooks on a given lure would be more effective.

This invention has for one of its principal objects the provision of a fishing lure, the hooks for which may be readily removed and replaced or exchanged for hooks of a different size or kind.

As another important object, this invention seeks to provide a mounting means for a fishing hook on a fishing lure, wherein said mounting means will permit the hook to be quickly detached without the use of special tools and yet will be sufficiently firm when attached to withstand the maximum anticipated pull exerted by a fish caught on the lure.

As a more specific object, this invention has within its purview the provision of an attaching means for the hook of a fishing lure, wherein said attaching means is in the form of a base element on the hook provided with laterally extending bayonets, and a socket on the lure into which the base may be inserted, with suitable slots in the socket for receiving the bayonets in locking relation thereto.

As an ancillary object this invention seeks to provide a fishing lure which has no hooks attached thereto, and to provide further one or more hooks having quickly detachable means for attaching said hooks to the lure at the time the lure is to be used.

A further specific object of this invention is the provision of a fishing lure having a plurality of interchangeable hooks therefor of various sizes and kinds to enable the fisherman to equip the lure with the type of hook best suited to the conditions at hand.

These and other objects of this invention will become apparent from the following detailed description when taken together with the accompanying drawings, in which FIG. 1 is a side elevational view of a fishing lure equipped with hooks having mounting means made in accordance with this invention;

Figure 1:
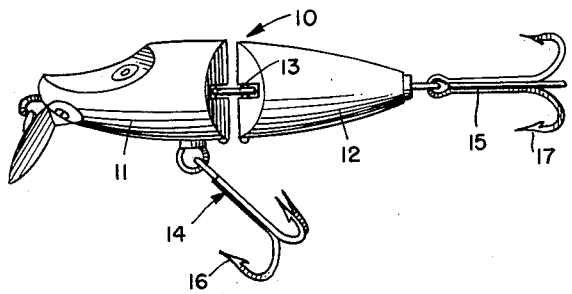
Figure 2:
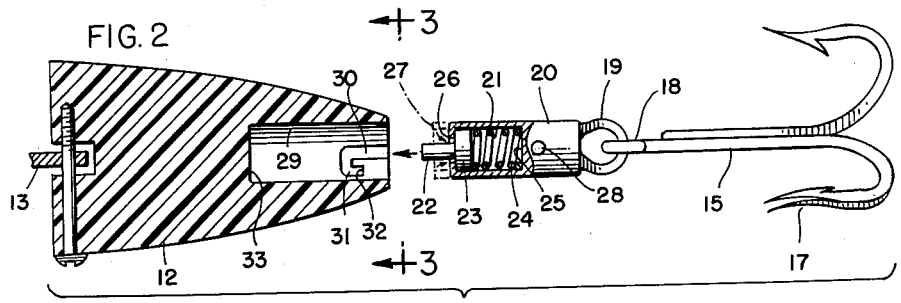
FIG. 2 is a side elevational view in section, on an enlarged scale of the rear portion of the fishing lure of FIG. 1, showing the mounting means for one of the hooks in detail.
Figure 3:
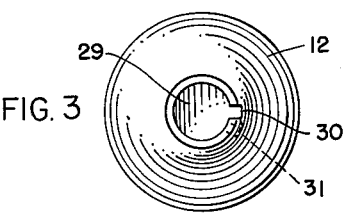
FIG. 3 is an end elevational view of the fishing lure of FIG. 2, looking in the direction of the arrows 3—3 of FIG. 2.
Figure 4:
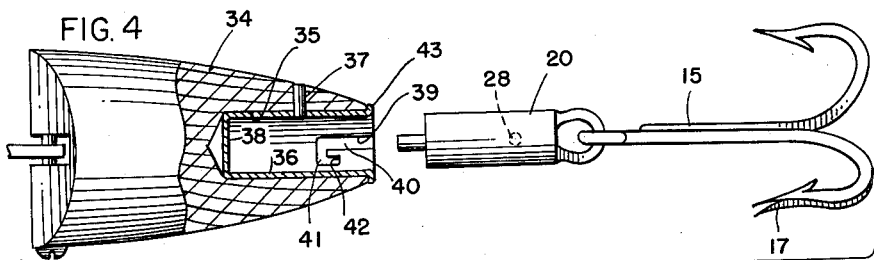
Figure 5:
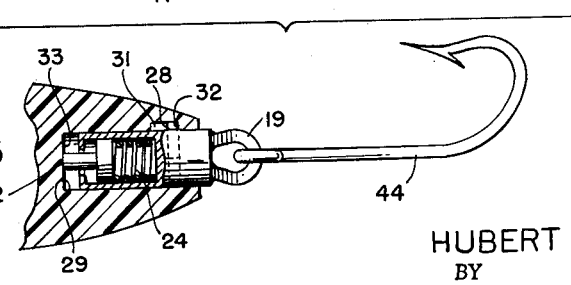

FIG. 4 is a side elevational view on a scale similar to that of FIG. 2 of the rear portion of a lure such as the one shown in FIG. 1, the lure being made of a different material from that of FIG. 1, and showing a different type of mounting means adapted for that material; and FIG. 5 is a side elevational view of an alternative form of hook which may be used in place of any of the hooks shown in the preceding views.

For purposes of illustration this invention will be described with reference to its application to a small fishing lure commonly used in inland waters for game fish such as bass, pike, etc. It is understood, however, that this invention may be applied with equal facility to lures used in coastal or deep sea waters for very large game fish without departing from the spirit of this invention, and without requiring substantial modification except as to size.

The form of lure illustrated in FIG. 1 may comprise a body 10 of plastic material such that it lends itself readily to formation by ordinary molding techniques. Said body is articulated and has a front section 11, a rear section 12 and a suitable link mechanism 13 of any well known form connecting the front and rear sections for swinging movement relative to one another to simulate the movement of a small fish in the water. Said lure 10, in the illustrative form shown in FIG. 1, may be provided with a front, bottom hook 14 and a rear hook 15, each of which is provided with a variety of barbs 16 and 17, respectively, to form the well known gang hook. Other lures may have other hooks and other arrangements of hooks, the arrangement shown in FIG. 1 being merely typical of the kind used with the lure illustrated.

The novel means for attaching the hooks 14 and 15 to the lure are identical in size and form and hence but one such attaching means will be described herein. The one chosen to illustrate the invention is that for the rear hook 15 and is shown in greater detail in the enlarged view of FIG. 2.

Adverting now to FIG. 2 it may be observed that the end of hook 15 opposite barb 17 is formed with an eye 18 which passes through a similar eye 19 on the righthand end, as viewed in FIG. 2, of a cylindrical base 20. The interlocking eyes provide limited pivotal movement of the hook relative to the eye about the axis of the cylindrical base. Said socket is preferably made of die cast metal so that eye 19 may be formed as an integral part of base 20. In the left-hand end of base 20, as viewed in FIG. 2, is formed a recess 21 which may be cylindrical in FIG. 2, is formed a recess 21 which may be cylindrical in form and which may be formed at the time the base is cast. Within recess 21 are disposed a pin 22 having a flange 23 formed in the end thereof which is normally disposed within recess 21, and a helical spring 24 which is compressed between flange 23 and the bottom 25 of recess 21. The length of pin 22 and the axial length of recess 21 are such that when the pin is forced into recess 21 until its free end is flush with the end of the recess, spring 24 will not be compressed to its solid height.

These proportions of the parts prevents damage to spring 24 which would result if it were to be compressed repeatedly to its solid height.

The flange 23 is retained within recess 21 by an inwardly extending flange 26 on the end of recess 21. Said flange 26 may be formed by rolling in a small section of the end of the recessed base (shown dotted at 27) after the spring and flanged pin are inserted in recess 21 and while the said spring and pin are held in their inner position in recess 21 as shown in FIG. 2.

Disposed between the bottom of recess 24 and the right-hand end of base 20 as viewed in FIG. 2 is a pin 28 which is preferably made from a short section of wire and pressed into a suitable opening formed in said socket at this point, the pin being permitted to extend outwardly beyond the cylindrical surface of base 20 to form a bayonet. The rear section 12 of the lure 10 has a cylindrical socket 29 formed in the rear section thereof, said socket having along one side thereof an axially extending groove 30 of a width adapted to receive the bayonet 28, and having its inner end 31 in the form of a hook such that when the bayonet 28 is slid axially into groove 30 and then turned to follow hook 31, it will ultimately bear against the end 32 of the hook portion 31 of the groove and will be held there against any axial forces tending to pull the base 20 out of its socket 29. The bottom 33 of base 29 is spaced from the end 32 of the hook portion of groove 30 a distance such that when bayonet 28 contacts said end 32 the pin 22 will have been moved axially into recess 21 against the spring 24 so that the reaction of said spring on the base 20 tends to hold bayonet 28 firmly against end 32 of the slot 30. This relationship of parts is shown more clearly in FIG. 5.

The insertion of the base 20 in the socket 29 is accomplished very readily by aligning bayonet 28 with groove 30 and then pushing base 20 and its bayonet axially along groove 30 to the hook portion 31 of the groove and then turning the base in its socket 29 until bayonet 28 moves back along hook portion 31 into contact with the end 32 of the groove. The base 20 constitutes an extension of the hook so that the base may be initially grasped with less danger of contact with the barbs of the hook. Once the base is inserted into the socket, it may be pushed into place and turned by pushing the hook against the base and then turning the base by turning the hook relative thereto to the limit of such movement and then turning the base with the hook by continued rotation in the same direction. The removal of the hook is accomplished very simply by the reversal of the foregoing movements, namely pushing base 20 into socket 29 until bayonet 28 is at the bottom of hook portion 31, and then turning base 20 until bayonet 28 is aligned with the axial portion of groove 30, whereupon the base may be pulled out of socket 29 and the hook freed from the lure.

Where the lure is made of plastic material, the socket 29 including groove 30, may be formed in a mold according to established molding procedures for the plastic material selected. Where the lure is made of wood, however, the groove 30 for the reception of the bayonet pin 28 cannot readily be made in the wood and hence the construction shown in FIG. 4 may be employed. Adverting to this figure it may be observed that there is shown a rear section 34 of a fishing lure of the type and configuration shown in FIG. 1, said rear section having an opening 35 drilled thereinto from the rear end of the section 34. A cup-shaped metal stamping 36 is pressed into opening 35 and then secured therein against both axial and rotated movement with respect to opening 35 by any appropriate adhesive material for adhering metal to wood. Alternatively an anchor pin 37 driven through the wood into stamping 36 may be used to lock the stamping 36 in opening 35. It may be observed that the bottom 38 of the stamping 36, in the event of the use of an adhesive, prevents such adhesive from entering into the stamping to interfere wtih the movement of base 20 therein.

A slot 39 is cut on the side of stamped socket 36, said slot corresponding in configuration and function to groove 30 and thus having an axial portion 40, a hook portion 41 and an end 42 simulatig the corresponding portions of groove 30 of FIG. 2, such that a bayonet pin 28 may enter slot 39, and then pass along the hook portion 41 thereof to end 42 where it is restrained against return movement out of the stamped socket 36.

To facilitate the entry of a base 20 into a stamping 36 the outer end of the stamping may be flared outwardly as at 43 to provide a radius for guiding the base 20 into the socket. Said flared end also serves to provide a limit stop for the socket as it is pressed into opening 35 thereby to locate slot 39 with respect to section 34.

It is contemplated that not only will the hooks of a given lure be removable and interchangeable with one another, but that an entire line of lures of various kinds will be furnished, each lure being provided with identical sockets for the reception of the bayonet type bases 20 of an assortment of sizes and kinds of hooks. The lures may be kept together instead of in separate receptacles or boxes and the hooks may then be provided with their own small receptacles or retainers, preferably of a transparent nature so that the hook may be readily visible. The number of hooks that a fisherman would carry would be relatively few, that is, possibly a half a dozen or so, either in pairs of different sizes or in pairs of different kinds, whereas the number of lures may be anything within the capacity of the tackle box used by the fisherman. Inasmuch as the fisherman would probably use but one lure at a time, only one set of hooks would be required at any one time, these hooks being exchanged for other hooks as frequently as desired, or transferred to other lures as the case may be. Thus, the cost of the lures may be considerably reduced since they would be furnished and purchased without hooks, and the investment in the assortment of hooks required will be relatively small since there would be considerably fewer hooks required than would be normally furnished with the assortment of lures commonly used by fishermen.

For the smaller lures a single bayonet pin and corresponding slot will be sufficient for holding any of the game fish that would be likely to take the lure. For deep sea fishing where the size of the fish may be considerably greater than that normally found in inland waters, larger lures with larger bases 20 would be required, and two or more bayonet pins and corresponding grooves would also be used to provide the greater strength required for the heavier fish.

It may be noted that in FIG. 5 a single hook 44 is shown in place of a gang hook 15 to illustrate the adaptability of the base and socket of this invention to any type of hook. The said base and socket may also be used to secure the lure to a leader, or one part of a lure to another part, etc., with equal facility.

It is understood that the foregoing description is merely illustrative of preferred embodiments of the invention and that the scope of the invention therefore is not to be limited thereto but is to be determined by the appended claim.

I claim:

In combination, a fish lure body having a recess therein defined in part by a substantially cylindrical wall, said wall having a bayonet slot formed therein, a fish-pulling element having a shank portion, a cylinder having a pivoted connection with the shank portion of the element, said cylinder being receivable in the recess in the fish lure body, said cylinder being solid throughout the portion of its length adjacent said pivoted connection and hollow throughout the remainder thereof, a pin extending through the solid portion and projecting radially beyond the cylindrical surface thereof, said projecting pin being receivable in the bayonet slot to lock the cylinder in the recess against movement out of the recess by the fish pulling element, a helical spring disposed in the hollow portion of the cylinder, a pin extending axially outwardly from the said hollow portion and having a radial flange thereon within the hollow portion abutting on the helical spring, and a radially inwardly extending retaining flange on the hollow portion holding the first-mentioned flange and spring against movement out of the cylinder, said axially extending pin being adapted to contact the bottom of the recess when the cylinder is received therein and the radially projecting pin is received in the bayonet slot in locking relation therewith.

References Cited in the file of this patent

UNITED STATES PATENTS

| | | |
|---|---|---|
| 1,710,102 | Moore | Apr. 23, 1929 |
| 2,307,200 | Cullerton | Jan. 5, 1943 |
| 2,419,037 | Safford | Apr. 15, 1947 |
| 2,884,732 | Bailer | May 5, 1959 |

FOREIGN PATENTS

| | | |
|---|---|---|
| 971 | Great Britain | 1880 |